(12) United States Patent
Shiraishi

(10) Patent No.: US 8,134,658 B2
(45) Date of Patent: Mar. 13, 2012

(54) LIQUID CRYSTAL DISPLAY MODULE

(75) Inventor: Naoya Shiraishi, Mobara (JP)

(73) Assignees: Hitachi Displays, Ltd., Tokyo (JP);
Panasonic Liquid Crystal Display Co., Ltd., Hyogo-ken (JP)

( * ) Notice: Subject to any disclaimer, the term of this patent is extended or adjusted under 35 U.S.C. 154(b) by 1094 days.

(21) Appl. No.: 12/007,763

(22) Filed: Jan. 15, 2008

(65) Prior Publication Data

US 2008/0170179 A1 Jul. 17, 2008

(30) Foreign Application Priority Data

Jan. 17, 2007 (JP) ................................. 2007-007601

(51) Int. Cl.
*G02F 1/1335* (2006.01)
(52) U.S. Cl. ............................ 349/65; 362/600; 362/615
(58) Field of Classification Search ........................ None
See application file for complete search history.

(56) References Cited

U.S. PATENT DOCUMENTS

| | | | | |
|---|---|---|---|---|
| 6,074,070 A * | 6/2000 | Sasako | ........................... | 362/607 |
| 6,443,583 B1 * | 9/2002 | Ha | ................................ | 362/608 |
| 7,210,838 B2 * | 5/2007 | Sakurai | ........................... | 362/607 |
| 2007/0085943 A1 * | 4/2007 | Kang et al. | ....................... | 349/65 |
| 2008/0043171 A1 * | 2/2008 | Takahashi et al. | .............. | 349/65 |
| 2008/0143931 A1 * | 6/2008 | Kashima | ......................... | 349/98 |

FOREIGN PATENT DOCUMENTS

JP 07-294921 4/1994

* cited by examiner

*Primary Examiner* — Thanh-Nhan Nguyen
(74) *Attorney, Agent, or Firm* — Stites & Harbison, PLLC; Juan Carlos A. Marquez, Esq.

(57) ABSTRACT

To provide a liquid crystal display module that eliminates the loss of light emitted from a light source. The present invention provides a liquid crystal display module including: a liquid crystal display panel; and a backlight, wherein the liquid crystal display panel includes an upper polarization plate and a lower polarization plate, the backlight is configured by a light source and a light guide plate, the light guide plate is configured in such a manner that the thickness of an incident face where light of the light source enters is larger than that of a portion opposed to the lower polarization plate, a light shielding member and a reflection member arranged on the light shielding member are provided at portions, of the liquid crystal display panel, corresponding in the upper direction to the incident face of the light guide plate, and the reflection member is formed along the light guide plate.

16 Claims, 5 Drawing Sheets

Prior Art   FIG.9
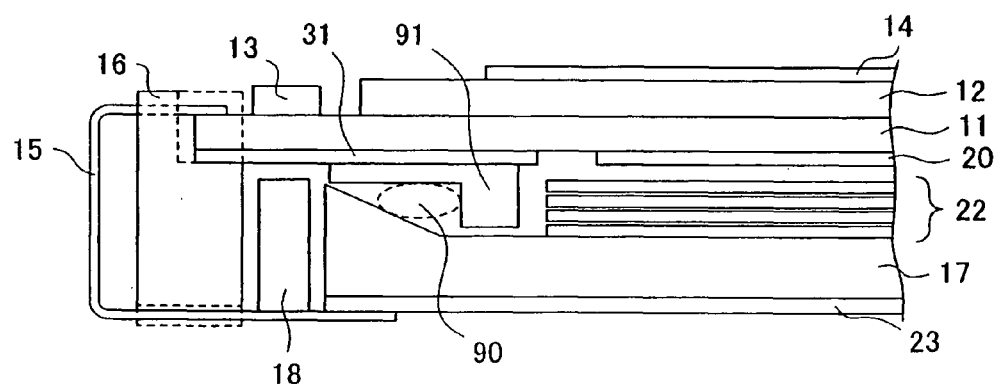
Prior Art   FIG.10
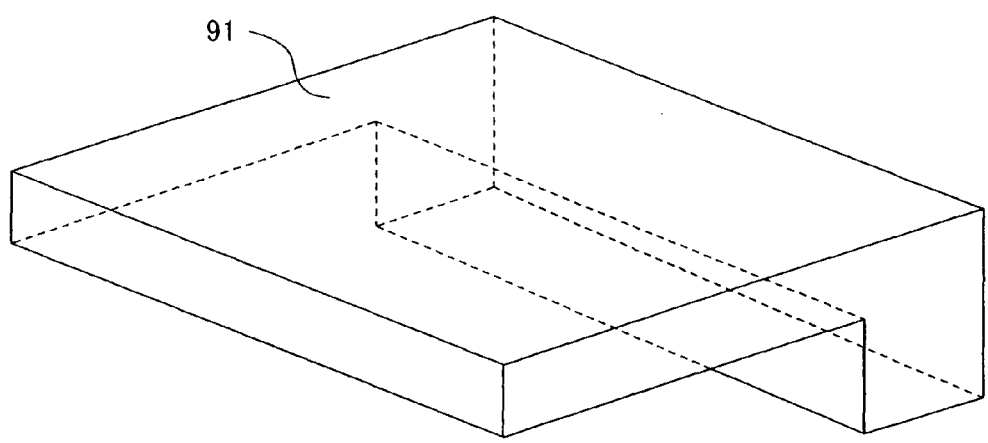

LIQUID CRYSTAL DISPLAY MODULE

CLAIM OF PRIORITY

The present application claims priority from Japanese Application JP 2007-007601 filed on Jan. 17, 2007, the content of which is hereby incorporated by reference into this application.

BACKGROUND OF THE INVENTION

1. Field of the Invention

The present invention relates to a liquid crystal display module in which a backlight is mounted, and particularly to a technique suitable for use in a small liquid crystal display module used for a mobile phone and the like.

2. Description of the Related Art

FIG. 9 is a diagram showing a cross sectional configuration of main components of a conventional liquid crystal display module.

A liquid crystal display panel is configured in such a manner that a liquid crystal layer (not shown) is sandwiched between a TFT substrate 11 and a color filter substrate 12 (hereinafter, referred to as CF substrate 12). The TFT substrate 11 is larger than the CF substrate 12 in size, and a driver chip 13 for controlling the driving of the liquid crystal display panel is arranged at a region, on the TFT substrate 11, that is not overlapped with the CF substrate 12. Further, an upper polarization plate 14 is arranged on the CF substrate 12, and a lower polarization plate 20 is arranged under the TFT substrate 11. Furthermore, a backlight is arranged under the liquid crystal display panel so as to configure a liquid crystal display module.

The backlight is configured by a light source 18 such as an LED arranged on a flexible print substrate 15 (hereinafter, referred to as FPC 15), and a light guide plate 17 through which light emitted from the light source 18 is guided to the entire liquid crystal display panel. Optical sheets 22 are arranged between the light guide plate 17 and the liquid crystal display panel. The optical sheets include, for example, an upper diffusion sheet, an upper prism sheet, a lower prism sheet, a lower diffusion sheet, and the like. A reflection sheet 23 is arranged under the light guide plate 17 so as to function to direct light guided under the light guide plate 17 toward the liquid crystal display panel. In order to satisfy the requirements of a thinner liquid crystal display apparatus, the light guide plate 17 is configured to be thinner except for an incident face opposed to the light source 18. Because the size of an LED that is suitable at present as the light source 18 is large, the thickness of the incident face is configured to be large. The incident face of the light guide plate 17 is configured to be large in size in accordance with the size of the LED. In FIG. 9, the reference numeral 16 denotes a mold frame, and the liquid crystal display module is configured in such a manner that the liquid crystal display panel is arranged above the frame-like mold frame and the backlight is arranged thereunder.

As shown in FIG. 9, a light shielding tape 31 is arranged on the TFT substrate 11 on the side where the lower polarization plate 20 is arranged and at a position above the light source 18. Further, a spacer tape 91 which has an L-shaped cross section as shown in FIG. 10 and which is configured by, for example, a white PET is arranged on the light shielding tape 31 so that unnecessary light is prevented from entering the liquid crystal display panel.

JP-A No. 1995-294921 is one of well-known techniques which describes a liquid crystal display module in which an incident face of the light guide plate is thus configured to be large.

In the case of the configuration shown in FIG. 9, a space 90 is formed between the light guide plate 17 and the spacer tape 91, and thus it has been found that a problem arises in that the space 90 causes the loss of light.

In view of the above-described problem, an object of the present invention is to provide a liquid crystal display module that eliminates the loss of light emitted from a light source.

SUMMARY OF THE INVENTION

According to one aspect of the present invention, there is provided a liquid crystal display module including: a liquid crystal display panel; and a backlight, wherein the liquid crystal display panel includes an upper polarization plate and a lower polarization plate, the backlight is configured by a light source and a light guide plate, the light guide plate is configured in such a manner that the thickness of a portion where light emitted from the light source enters (in other words, the thickness of an incident face) is larger than that of a portion opposed to the lower polarization plate (in other words, the height of the light guide plate corresponding to a display area of the liquid crystal display panel), a light shielding member such as a light shielding tape and a reflection member arranged on the light shielding member are provided at portions, of the liquid crystal display panel, opposed in the upper direction to the incident face of the light guide plate, and the reflection member is formed along the light guide plate. The light guide plate is formed in a planar shape in which the thickness of a portion corresponding to a display area is equal, or formed in a wedge shape in which the thickness of a portion corresponding to a display area is gradually changed in accordance with a distance from a light source. The light guide plate formed in any one of the above-described shapes can be applied in the present invention. For example, if the light guide plate formed in a wedge shape is used, the thickness of a portion opposed to the lower polarization plate of the present invention (in other words, the height of the light guide plate opposed to a display area of the liquid crystal display panel) may mean the thickness of the light guide plate or the height of the light guide plate corresponding to a display area nearer the light source. In yet other words, the present invention can be applied to a liquid crystal display module having a light guide plate configured in such a manner that the thickness of an incident face of the light guide plate is larger than that of a face opposite to the incident face.

By employing such a configuration, it is possible to provide a liquid crystal display module that eliminates the loss of light emitted from a light source.

In the liquid crystal display module, the light shielding member is arranged from an end portion of the liquid crystal display panel (in this case, if the light shielding member is formed from an end portion of the liquid crystal display panel, the highest light shielding effect is exhibited. If the light shielding member is formed at least up to a position above the light source, the light shielding effect is exhibited.) up to a position that is not overlapped with a portion of the arrangement position of the lower polarization plate, and the reflection member is arranged at a position, on the light shielding member, that is not overlapped with a position above the arrangement position of the light source. Accordingly, the configuration can be applied to a thinner liquid crystal display module.

As one of concrete examples of the reflection member, it is conceivable that the reflection member is configured by a base portion and a sheet portion. As one example in this case, the base portion and the sheet portion can be integrally configured. As described above, if the reflection member is integrally formed by the base portion and the sheet portion, the number of components can be reduced, resulting in excellence in workability when assembling the product. Further, the reflection sheet is usually arranged under the light guide plate. One of the characteristics of the present invention is that the reflection member of the present invention and the reflection sheet arranged under the light guide plate are configured by using the same material.

Further, as another configuration example, it is conceivable that the reflection member is configured by the base portion and the sheet portion that are different from each other. Also in this case, the reflection sheet is arranged under the light guide plate. It is conceivable that the reflection member of the present invention and the reflection sheet arranged under the light guide plate are configured by using the same material.

As described above, in the case where the reflection member is configured by the base portion and the sheet portion that are different from each other, one of the characteristics of the present invention is that the base portion is configured by a PET in a rectangular parallelepiped shape and the reflection member is configured by a sheet-like member. In this case, if one end of the reflection member is attached to the base portion, and the other end thereof is attached to the light shielding member, it is conceivable that the formation of complex shapes is not necessary, and a liquid crystal display module that can eliminate the limitation of processing the components.

According to another aspect of the present invention, there is provided a liquid crystal display module including: a liquid crystal display panel; and a backlight, wherein the backlight is a backlight of a side-light type in which a light source is arranged on a side face of a light guide plate, the light guide plate is configured in such a manner that the thickness of an incident face where light of the light source enters is larger than that of a face positioned opposite to the incident face, a light shielding member is formed at a portion, of the liquid crystal display panel, opposed in the upper direction to the incident face of the light guide plate, a sheet-like reflection member along the shape of the light guide plate is formed on the light shielding member, and the sheet-like reflection member is configured in such a manner that one end thereof is attached to a base portion arranged on the light shielding member and the other end thereof is attached to the light shielding member.

Even in such a configuration, it is possible to provide a liquid crystal display module that eliminates the loss of light emitted from a light source.

Further, if the light shielding member is, at least, arranged from a position above the light source up to a position that is not overlapped with a portion of the arrangement position of the lower polarization plate, and the reflection member is arranged at a position, on the light shielding member, that is not overlapped with a position above the arrangement position of the light source, it is possible to satisfy the requirements for making thinner the whole liquid crystal display module.

Further, the reflection sheet is usually arranged under the light guide plate. The reflection member of the present invention and the reflection sheet can be configured by using the same material. Furthermore, the above-described base portion may be configured by, for example, a PET in a rectangular parallelepiped shape. In a precise sense, the base portion is not necessarily formed in a rectangular parallelepiped shape, but a substantially rectangular parallelepiped shape is included in the rectangular parallelepiped shape of the present invention.

Further, if a distance between the light guide plate and the reflection member arranged in the normal-line direction of the light guide plate is as large as 0.02 mm or less, the effects of the present invention can be obtained.

The light guide plate of the present invention has a cross section inclined from a portion (incident face) where light of the light source enters, at least to a position of a portion opposed to the lower polarization plate.

According to still another aspect of the present invention, there is provided a liquid crystal display module including: a liquid crystal display panel; and a backlight, wherein the liquid crystal display panel includes an upper polarization plate and a lower polarization plate, the backlight is configured by a light source and a light guide plate, the light guide plate is configured in such a manner that a portion where light of the light source enters is larger than that opposed to the lower polarization plate in size, and a light shielding member such as a light shielding tape and a reflection member arranged on the light shielding member are provided at portions, of the liquid crystal display panel, corresponding in the upper direction to the incident face of the light guide plate.

In this configuration, the light shielding member is, at least, arranged from a position above the light source up to a position that is not overlapped with a portion of the arrangement position of the lower polarization plate, and the reflection member is arranged at a position, on the light shielding member, that is not overlapped with a position above the arrangement position of the light source. This configuration is preferable in terms of achievement of making thinner the whole liquid crystal display module.

According to the present invention, it is possible to provide a liquid crystal display apparatus that eliminates the loss of light emitted from a light source.

BRIEF DESCRIPTION OF THE DRAWINGS

FIG. 9 is a diagram showing a cross sectional configuration of main components of a conventional liquid crystal display module; and FIG. 10 is a diagram showing a configuration of a spacer tape used in a convention liquid crystal display module.

DETAILED DESCRIPTION OF THE PREFERRED EMBODIMENTS

Hereinafter, the present invention will be described in detail by using the drawings.

First Embodiment

Figure 1:
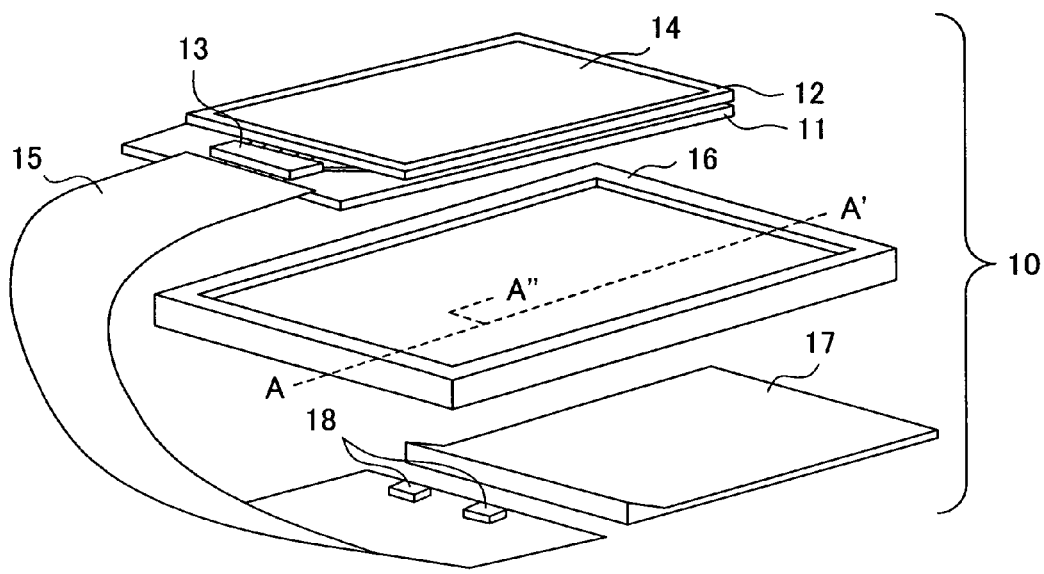
FIG. 1 is a diagram showing the whole configuration of a liquid crystal display module according to the present invention.

FIG. 1 shows a configuration of a liquid crystal display module 10 according to the present invention.

A liquid crystal display panel is configured in such a manner that a TFT substrate 11 configured by an insulating transparent substrate such as a glass substrate and a plastic substrate is overlapped with a color filter substrate 12 (hereinafter, referred to as CF substrate 12) so as to sandwich a liquid crystal layer. In addition, a driver chip 13 for controlling the driving of the liquid crystal display panel is formed at a region, on the TFT substrate 11, that is not overlapped with the CF substrate 12. Further, in order to supply a signal to the driver chip 13, one end of a flexible print substrate 15 is arranged. Furthermore, an upper polarization plate 14 is arranged on the CF substrate 12, and a lower polarization plate is arranged on the TFT substrate 11. Since the driver chip 13 is arranged on the TFT substrate 11, the CF substrate is smaller than the TFT substrate in size. It is obvious that when the driver chip is arranged on the CF substrate, the CF substrate is larger than the TFT substrate in size.

The liquid crystal display panel is arranged above a frame-like mold frame 16. Under the mold frame 16, there are arranged optical sheets (not shown) such as an upper diffusion sheet, an upper prism sheet, a lower prism sheet, and a lower diffusion sheet, a light guide plate 17, and a reflection sheet 19, so that they are sandwiched by a part of the other end of the flexible print substrate 15 and the mold frame 16. On the other end of the flexible print substrate 15, there are arranged light sources 18 such as LEDs while being opposed to a side face of the light guide plate 17.

Figure 2:
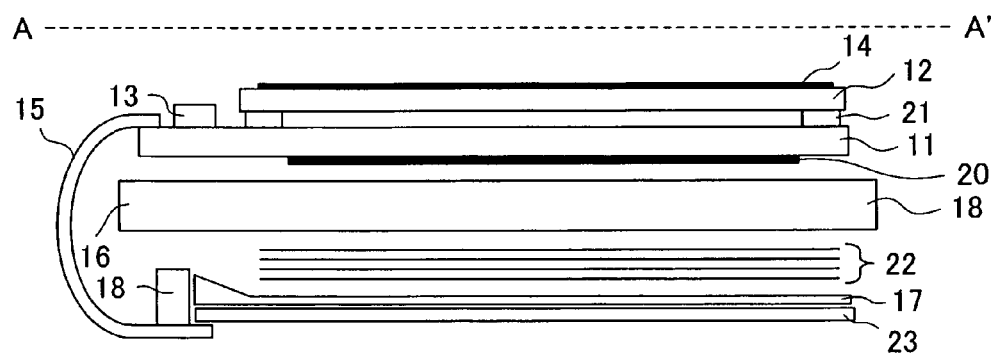
FIG. 2 is a diagram showing a cross sectional configuration taken along the line A-A' in the liquid crystal display module of the present invention in FIG. 1.

One side face (incident face) of the light guide plate 17 is arranged so as to be opposed to the light sources 18, and the light guide plate 17 is accommodated in the mold frame 16 on the side opposite to the side where the liquid crystal display panel is accommodated. In addition, a reflection sheet 23 arranged under the light guide plate 17 is attached to the mold frame 16 according to a positional relation as shown in FIG. 2 by an adhesive formed at the circumference of the reflection sheet 23. A backlight in which the light sources are thus arranged on a side face of the light guide plate is generally called a backlight on a side-light side.

FIG. 2 is a diagram showing a cross sectional configuration taken along the line A-A' in the liquid crystal display module of the present invention in FIG. 1. FIG. 2 shows a state in which the liquid crystal display module shown in FIG. 1 is accommodated in an upper frame 21 and a lower frame 22.

As shown in FIG. 2, a lower polarization plate 20 is arranged even on the TFT substrate 11, and optical sheets 22 are arranged between the light guide plate 17 and the liquid crystal display panel. The reflection sheet 23 is arranged under the light guide plate 17.

Figure 3:
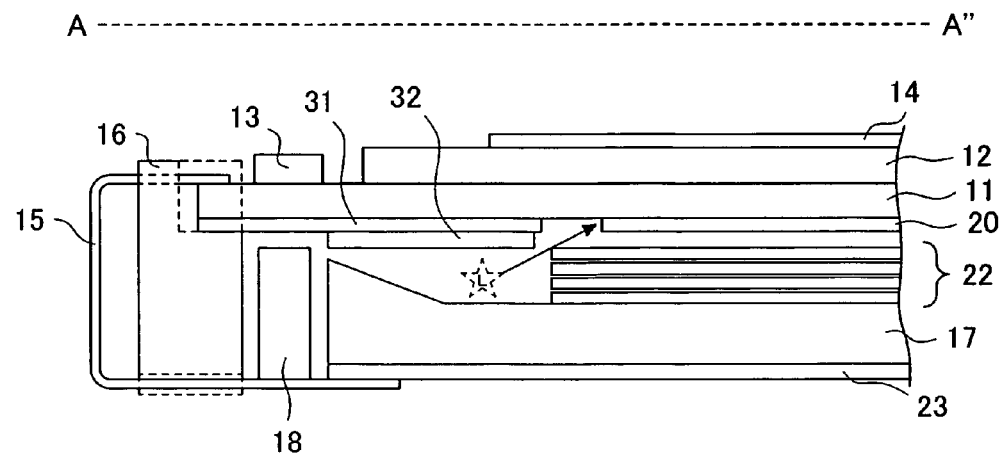
FIG. 3 is a diagram showing a cross sectional configuration of main components taken along the line A-A" in the liquid crystal display module in FIG. 1.

FIG. 3 is a diagram showing a cross sectional configuration of main components taken along the line A-A' in the liquid crystal display module in FIG. 1. In FIG. 3, a light shielding member 31 extends from a position above the light sources 18 toward the direction of the lower polarization plate 20. The light shielding member 31 is preferably arranged to the extent not to overlap with the lower polarization plate 20.

In the embodiment, a reflection member 32 in a planar shape is arranged in place of a spacer tape with an L-shaped cross section that is configured by a white PET and arranged on the light shielding member 31 such as a light shielding tape.

As described above, the reflection member 32 is arranged on the light shielding member 31 to the extent not to reach a position above the light sources 18. Accordingly, light emitted from the light guide plate 17 before reaching the optical sheets 22 can be returned to the light guide plate 17 side by the reflection member 32, and light from the light sources 18 can be guided to the liquid crystal display panel without loss. As a material of the reflection member 32 in the embodiment, for example, the same material as the reflection sheet 23 arranged under the light guide plate 17 may be used. It is conceivable that the reflection member 32 is configured by, for example, a silver sheet formed by coating the surface of a PET as a base material with silver.

In the embodiment, the reflection member 32 is not arranged above the light sources 18 due to a problem that the whole thickness of the liquid crystal display module becomes larger if the thickness of the reflection member 32 is larger than the distance of a space between the light sources 18 and the light shielding member 31. Therefore, in the case where the whole thickness of the liquid crystal display module is not considered at all, it is possible to arrange the reflection member 32 to the extent to reach a position above the light sources 18.

Second Embodiment

In the case of the configuration of the first embodiment, there occurs a problem that light L leaks toward the liquid crystal display panel from between the reflection member 32 and the optical sheets 22 due to the planar shape of the reflection member 32 as shown in FIG. 3, the light enters from a side face of the polarization plate 20, or directly enters the TFT substrate 11 without passing through the polarization plate 20. The light is one that is not controlled by the polarization plate, or unpolarized light that has not passed through the polarization plate. Thus, the light is not preferable as light that enters the liquid crystal display panel. Accordingly, it is desirable to eliminate such the light L as much as possible. In addition, a space between the light guide plate 17 and the reflection member 32 as shown in FIG. 3 is likely to cause the TFT substrate 12 to bend when a force is applied from a region, on the TFT substrate 11, that is not overlapped with the CF substrate 12, or from a position above the CF substrate 12. Accordingly, it is desirable to minimize the space as small as possible. Further, in the case where the incident face of the light guide plate is shaped to be wide as described in the present invention, it is necessary to devise in order to economically and effectively collect light.

Figure 4:
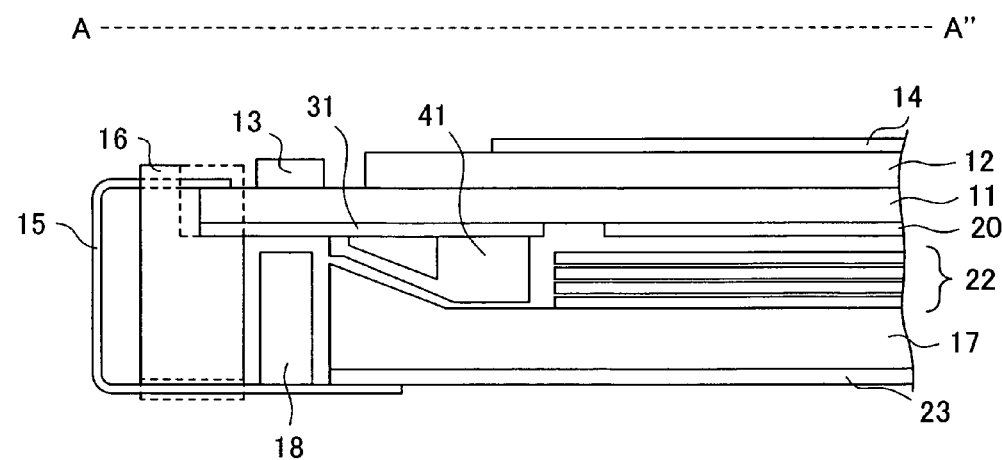
FIG. 4 is a diagram showing a configuration of a second embodiment obtained by further improving the configuration of a first embodiment.

FIG. 4 is a diagram showing a configuration of a second embodiment obtained by further improving the configuration of the first embodiment.

The second embodiment shown in FIG. 4 shows a state in which a reflection member 41 is formed along the shape of the light guide plate 17. In FIG. 4, the light shielding member 31 extends from a position above the light sources 18 toward the direction of the lower polarization plate 20. The light shielding member 31 is preferably arranged to the extent not to overlap with the lower polarization plate 20.

Figure 5:
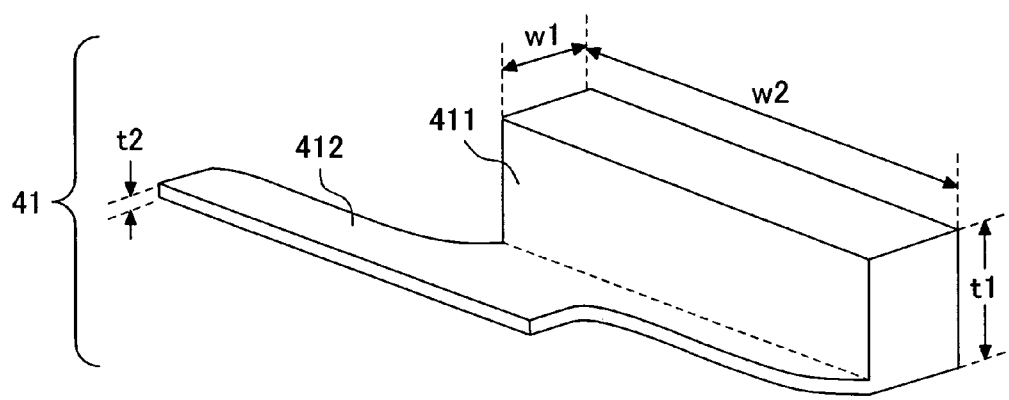
FIG. 5 is a diagram showing one concrete example of a reflection sheet of the second embodiment.

The shape of the reflection member 41 will be described in detail by using FIG. 5.

The reflection member 41 in the second embodiment can be configured by using, for example, the same material as the reflection sheet 23 arranged under the light guide plate 17. The reflection member 41 in the second embodiment is configured by a base portion 411 and a sheet portion 412. For example, a width w1, a length w2, and a height t1 of the base portion are as large as 0.85 mm, 34.7 mm, and 0.21 mm, respectively, and a thickness t2 of the sheet portion 412 is as large as 0.06 mm. In the second embodiment, it is important to arrange the reflection member 41 along the shape of the light guide plate 17. Due to a problem of processing accuracy of the reflection member 41, there is shown an example, as a concrete configuration of the reflection member 41 along the shape of the light guide plate 17, that the base portion 411 and the sheet portion 412 are separately configured. Even if the sheet portion 412 is brought in contact with the light guide plate 17, stress is not transmitted to the liquid crystal display panel and the light guide plate 17 by flexibility of the sheet portion 412. In the second embodiment, in addition to the base portion 411, an end portion of the sheet portion 412 is arranged so as to be attached to the light shielding member 31 configured by, for example, a light shielding tape.

Figure 6:
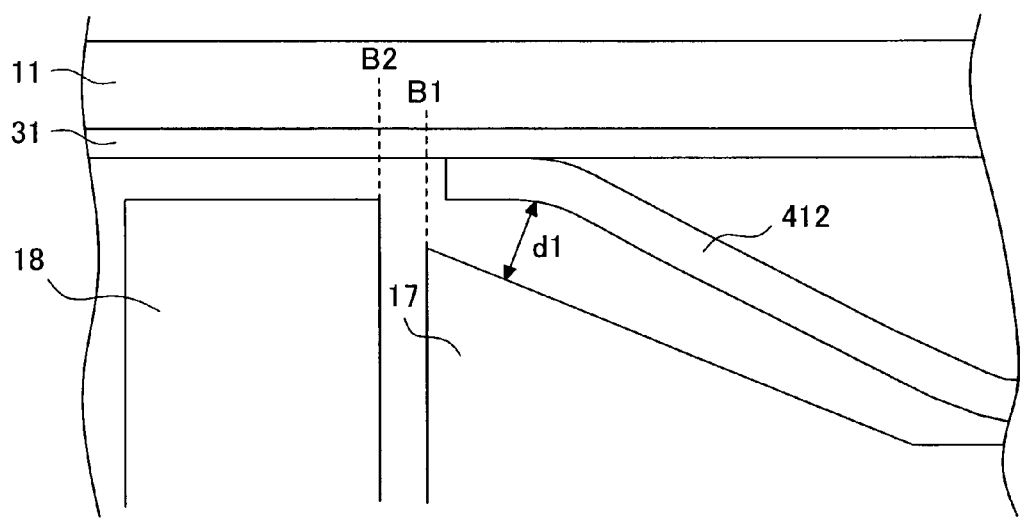
FIG. 6 further shows a configuration of main components of the configuration of the second embodiment.

FIG. 6 further shows a configuration of main components of the configuration of the second embodiment.

As shown in FIG. 6, one of the characteristics of the second embodiment is that the reflection member 41 arranged nearer the liquid crystal display panel is arranged along the shape of the light guide plate 17. The arrangement along the shape of the light guide plate in the second embodiment means a state in which the reflection sheet 41 (412 in the case of FIG. 6) is arranged apart from the light guide plate 17 in the vertical direction by 0.02 mm at the most, in other words, the reflection sheet 41 is arranged within a range of 0.02 mm or less from the light guide plate 17 in the vertical direction. In a normal situation, the reflection member 41 is ideally arranged so as to be closely attached along the shape of the light guide plate 17. However, when the mass productivity of the product and processing accuracy are taken into account, the configuration such as the second embodiment is a real solution. In view of this point, the second embodiment is thus configured.

Further, it is important that the reflection member 41 (412 in the case of FIG. 6) is not arranged up to a position B2 where the reflection member 41 is to be overlapped with a position above the light sources 18. This is because the whole thickness of the liquid crystal display module becomes larger when the thickness of the reflection member 41 (412 in the case of FIG. 6) is larger that a space between the light sources 18 and the light shielding member 31. It is obvious that if the whole thickness of the liquid crystal display module is not considered at all, such a limitation is not necessary. When the mass productivity is taken into account, it is conceivable that the reflection member 41 (412 in the case of FIG. 6) is preferably arranged so as not to cross an end portion B1 of the incident face of the light guide plate 17.

Third Embodiment

Figure 7:
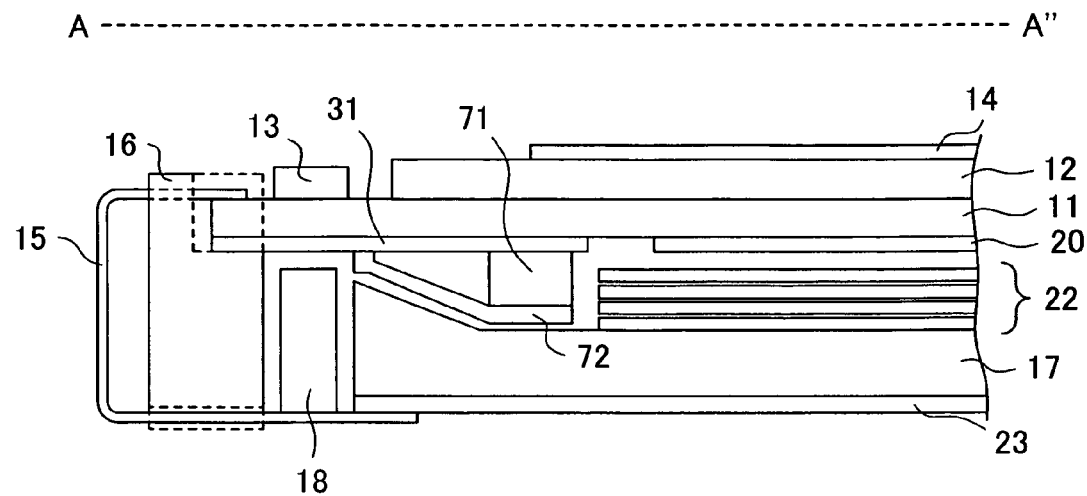
FIG. 7 is a diagram showing a third embodiment and shows still another configuration example of the second embodiment.

FIG. 7 is a diagram showing a third embodiment and shows still another configuration example of the second embodiment.

In FIG. 7, the light shielding member 31 extends from a position above the light sources 18 toward the direction of the lower polarization plate 20. The light shielding member 31 is preferably arranged to the extent not to overlap with the lower polarization plate 20.

In the second embodiment, as a concrete configuration example for arranging the reflection member 41 arranged nearer the liquid crystal display panel along the shape of the light guide plate 17, there is shown an example in which the reflection member 41 is integrally configured by the base portion 411 and the sheet portion 412. However, a base portion 71 and a sheet portion 72 of the reflection member 41 are separately configured in the third embodiment. In the case of such a configuration, to be exact, the base portion 71 does not need to carry out a reflection function, and accordingly, the base portion 71 may not be a reflection member, but is regarded as a part of a reflection member in the embodiment. In the case of the configuration of the third embodiment, the base portion 71 configured by, for example, a white PET or the like is arranged nearer the liquid crystal display panel, and the sheet portion 72 is arranged so as to be attached to the base portion 71, as shown in FIG. 7. In the case of the third embodiment, the sheet portion 72 is attached to the base portion 71, and at the same time, an end portion thereof is arranged so as to be attached to the light shielding member 31. As a material of the sheet portion 71, it is conceivable that the sheet portion 71 is configured by, for example, a silver sheet formed by coating the surface of a PET as a base material with silver. It is conceivable that the sheet portion is configured by using the same material as the reflection sheet arranged under the light guide plate. A thickness t3 of the sheet portion 71 is as large as about 0.06 mm (no less than 0.04 mm and no more than 0.08 mm) as similar to the thickness of the sheet portion shown in the second embodiment.

Figure 8:
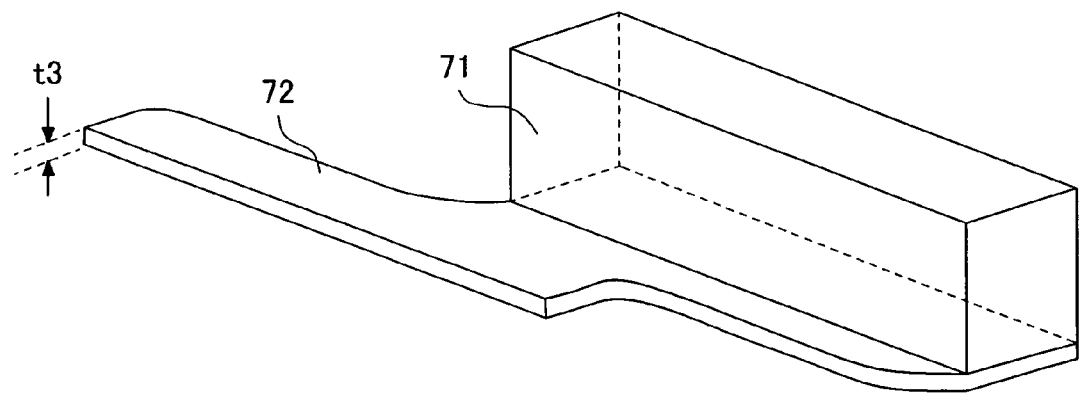
FIG. 8 is a diagram showing a state of a base portion 71 and a sheet portion 72 in the third embodiment.

FIG. 8 is a diagram showing a state of the base portion 71 and the sheet portion 72 in the third embodiment. Unlike the concrete example shown in the second embodiment, the sheet portion 72 is different from the base portion 71 as constituent elements. The matters described by using FIG. 6 in the second embodiment are the same in the third embodiment.

What is claimed is:

1. A liquid crystal display module comprising:
a liquid crystal display panel; and
a backlight,
wherein the liquid crystal display panel includes an upper polarization plate and a lower polarization plate,
the backlight is configured by a light source and a light guide plate,
the light guide plate is configured in such a manner that a thickness of an incident face where light of the light source enters is larger than that of a portion opposed to the lower polarization plate,
the light guide plate has an inclined plane between the incident face and the portion opposed to the lower polarization plate,
a light shielding member and a flexible reflection member arranged on the light shielding member are provided at portions of the liquid crystal display panel that are opposed in an upper direction to the incident face of the light guide plate, and
the flexible reflection member is formed along the inclined plane of the light guide plate and configured by a base portion and a sheet portion.

2. The liquid crystal display module according to claim 1, wherein the light shielding member extends from a position above the light source toward the direction of the lower polarization plate, and is arranged so as not to be overlapped with the lower polarization plate, and the reflection member is arranged at a position, on the light shielding member, that is not overlapped with a position above the arrangement position of the light source.

3. The liquid crystal display module according to claim 1, wherein the base portion and the sheet portion are integrally configured.

4. The liquid crystal display module according to claim 3, wherein a reflection sheet is arranged under the light guide plate, and the reflection member and the reflection sheet are configured by using the same material.

5. The liquid crystal display, module according to claim 1, wherein the base portion and the sheet portion are separately configured.

6. The liquid crystal display module according to claim 5, wherein the reflection sheet is arranged under the light guide plate, and the reflection member and the reflection sheet are configured by using the same material.

7. The liquid crystal display module according to claim 5, wherein the base portion is configured by a PET in a rectangular parallelepiped shape, and the reflection member is configured by a sheet-like member.

8. The liquid crystal display module according to claim 7, wherein one end of the reflection member is attached to the base portion, and the other end thereof is attached to the light shielding member.

9. The liquid crystal display module according to claim 1, wherein the light guide plate has a cross section inclined from a portion where light of the light source enters, to a portion opposed to the lower polarization plate.

10. A liquid crystal display module comprising:
a liquid crystal display panel; and
a backlight,
wherein the liquid crystal display panel includes an upper polarization plate and a lower polarization plate,
the backlight is configured by a light source and a light guide plate,
the light guide plate is configured in such a manner that a thickness of an incident face where light of the light source enters is larger than that of a portion opposed to the lower polarization plate,
the light guide plate has an inclined plane between the incident face and the portion opposed to the lower polarization plate,
a light shielding member and a flexible reflection member arranged on the light shielding member are provided at portions of the liquid crystal display panel that are opposed in an upper direction to the incident face of the light guide plate,
the flexible reflection member is formed along the inclined plane of the light guide plate, and
a distance between the light guide plate and the reflection member arranged in the normal-line direction of the light guide plate is as large as 0.02 mm or less.

11. A liquid crystal display module comprising:
a liquid crystal display panel; and
a backlight,
wherein the backlight is a backlight of a side-light type in which a light source is arranged on a side face of a light guide plate,
the light guide plate is configured in such a manner that a thickness of an incident face where light of the light source enters is larger than a thickness of a face positioned opposite to the incident face,
the light guide plate has an inclined plane between the incident face and a portion having a thickness that is equal to the thickness of the face positioned opposite to the incident face,
a light shielding member is formed at a portion of the liquid crystal display panel that is opposed in an upper direction to the incident face of the light guide plate,
a sheet-like reflection member is formed on the light shielding member along the inclined plane of the light guide plate, and
the sheet-like reflection member is configured in such a manner that one end thereof is attached to a base portion arranged on the light shielding member and the other end thereof is attached to the light shielding member.

12. The liquid crystal display module according to claim 11, wherein the light shielding member extends from a position above the light source toward the direction of a lower polarization plate, and is arranged so as not to be overlapped with the lower polarization plate, and the reflection member is arranged at a position, on the light shielding member, that is not overlapped with a position above the arrangement position of the light source.

13. The liquid crystal display module according to claim 11, wherein a reflection sheet is arranged under the light guide plate, and the reflection member and the reflection sheet are configured by using the same material.

14. The liquid crystal display module according to claim 11, wherein the base portion is configured by a PET in a rectangular parallelepiped shape.

15. The liquid crystal display module according to claim 11, wherein a distance between the light guide plate and the reflection member arranged in the normal-line direction of the light guide plate is as large as 0.02 mm or less.

16. The liquid crystal display module according to claim 11, wherein the light guide plate has a cross section inclined from a portion where light of the light source enters, at least to a position of a portion opposed to a lower polarization plate.

* * * * *